(12) United States Patent
Phillips

(10) Patent No.: US 8,167,754 B2
(45) Date of Patent: *May 1, 2012

(54) THREE-MODE HYBRID POWERTRAIN WITH TWO MOTOR/GENERATORS

(75) Inventor: Andrew W. Phillips, Rochester, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 316 days.

This patent is subject to a terminal disclaimer.

(21) Appl. No.: 12/576,320

(22) Filed: Oct. 9, 2009

(65) Prior Publication Data

US 2011/0086737 A1    Apr. 14, 2011

(51) Int. Cl.
*F16H 3/72* (2006.01)
(52) U.S. Cl. ............................ 475/5; 475/292
(58) Field of Classification Search .................. 475/5, 8, 475/279, 283, 287, 291, 292
See application file for complete search history.

(56) References Cited

U.S. PATENT DOCUMENTS

| | | | |
|---|---|---|---|
| 2006/0052199 A1* | 3/2006 | Singh et al. | 475/5 |
| 2011/0130234 A1* | 6/2011 | Phillips | 475/5 |
| 2011/0230291 A1* | 9/2011 | Phillips | 475/5 |

* cited by examiner

*Primary Examiner* — Edwin A Young
(74) *Attorney, Agent, or Firm* — Quinn Law Group, PLLC

(57) ABSTRACT

A hybrid electro-mechanical transmission connectable with multiple power sources for launching and propelling a vehicle includes an output member and a stationary member. The transmission also includes a first planetary gear set having a first, a second, and a third node, and a compound planetary gear arrangement having a fourth, a fifth, a sixth, and a seventh node. The power sources include an engine, a first motor/generator and a second motor/generator. The engine, the first motor/generator and the second motor/generator are each operatively connected with the first planetary gear set, and the output member and the second motor/generator are each operatively connected with the compound planetary gear arrangement. Thus configured, the transmission provides forward under-drive and forward direct-drive gears for launching and propelling the vehicle, as well as a reverse gear.

20 Claims, 4 Drawing Sheets

THREE-MODE HYBRID POWERTRAIN WITH TWO MOTOR/GENERATORS

TECHNICAL FIELD

The invention relates to a hybrid electro-mechanical powertrain having two motor/generators.

BACKGROUND OF THE INVENTION

To produce a more efficient vehicle, common hybrid vehicle powertrains combine an electric motor and a conventional engine. Torque from the engine and the electric motor is typically channeled to the vehicle's driven wheels via a transmission. Efficiency of a hybrid vehicle powertrain is typically related to the percentage of time and during what type of driving conditions the engine must be run in addition to or in place of the electric motor to power the vehicle.

Some hybrid powertrains employ a single electric motor in combination with the engine. In such powertrains, transmission output, and hence vehicle speed, is directly related to the speeds and torques of the engine and the electric motor. Other hybrid powertrains employ two electric motors in combination with the engine to power the vehicle.

A hybrid powertrain utilizing an engine and two electric motors may connect the engine and the electric motors to a transmission such that torque and speed of the engine may be selected independently of vehicle speed and desired acceleration. Such control of the engine is typically achieved by varying individual torque contribution from the two electric motors. Thus, a hybrid powertrain utilizing an engine in combination with two electric motors may provide suitable torque contribution from each of the engine and the two motors and afford improved overall vehicle efficiency.

SUMMARY OF THE INVENTION

A hybrid electro-mechanical transmission connectable with multiple power sources for launching and propelling a vehicle is provided, and includes an output member and a stationary member. The transmission also includes a first planetary gear set and a compound planetary gear arrangement. The first planetary gear set has a first, a second, and a third node, and the compound planetary gear arrangement has a fourth, a fifth, a sixth, and a seventh node. The power sources include a first motor/generator, a second motor/generator and an engine. The engine, the first motor/generator and the second motor/generator are each operatively connected with the first planetary gear set. The output member and the second motor/generator are each operatively connected with the compound planetary gear arrangement. Thus configured, the transmission provides a forward low gear ratio, i.e., a forward under-drive mode, for launching the vehicle. The transmission also provides a forward direct-drive gear ratio, i.e., a forward under-drive mode, for propelling the vehicle at higher speeds. As configured, the transmission additionally provides a reverse gear ratio, i.e., a reverse mode, for launching the vehicle in reverse.

The compound planetary gear arrangement may include a second and a third planetary gear set. Accordingly, the first node may be a ring gear member of the first planetary gear set, the second node may be a carrier member of the first planetary gear set, and the third node may be a sun gear member of the first planetary gear set. Furthermore, the fourth node may be a ring gear member of the second planetary gear set, the fifth node may be a carrier member of the second planetary gear set in fixed connection with a carrier member of the third planetary gear set, the sixth node may be a sun gear member of the second planetary gear set in fixed connection with a sun gear member of the third planetary gear set, and the seventh node may be a ring gear member of the third planetary gear set.

The engine may be operatively connected to the first node. Furthermore, the first motor/generator may be operatively connected to the third node, and the second motor/generator may be operatively connected to the second and to the sixth nodes. Consequently, the output member is then operatively connected to the seventh node.

The transmission may include a first torque-transmitting device, a second torque-transmitting device and a third torque-transmitting device. In such a configuration, the first torque-transmitting device is engageable to ground the fourth node to the stationary member. Additionally, the second torque-transmitting device is engageable to lock any one of the fourth, fifth, sixth and seventh nodes to any other of the fourth, fifth, sixth and seventh nodes. The third torque-transmitting device is then engageable to ground the seventh node to the stationary member.

As disclosed, the transmission may provide the forward under-drive mode via engaging the first torque-transmitting device and disengaging both the second and the third torque-transmitting devices. Additionally, the transmission may provide the forward direct-drive mode via engaging the second torque-transmitting device and disengaging both the first and the third torque-transmitting devices. Furthermore, the transmission may transmit torque from the engine in the reverse mode via engaging the third torque-transmitting device and disengaging the first and the second torque-transmitting devices.

The transmission may further include a fourth torque-transmitting device. In such a case, the fourth torque-transmitting device is engageable to ground the engine to the stationary member. Such engagement of the fourth torque-transmitting device permits the transmission to provide the forward under-drive and the reverse modes for launching the vehicle via a combination of the first motor/generator and the second motor/generator without the aid of the engine.

Any of the first torque-transmitting device, the second torque-transmitting device and the third torque-transmitting device may have the capability to transmit torque in two directions and be configured as either a selectively engageable clutch or a brake. The fourth torque-transmitting device may be configured as a one way clutch.

In the transmission, the respective operative connections of the engine and of the motor/generators with the first, the second and the third planetary gear sets may facilitate a controlled selection of speeds and torques of the engine and of the motor/generators for launching and propelling the vehicle.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

Figure 1:
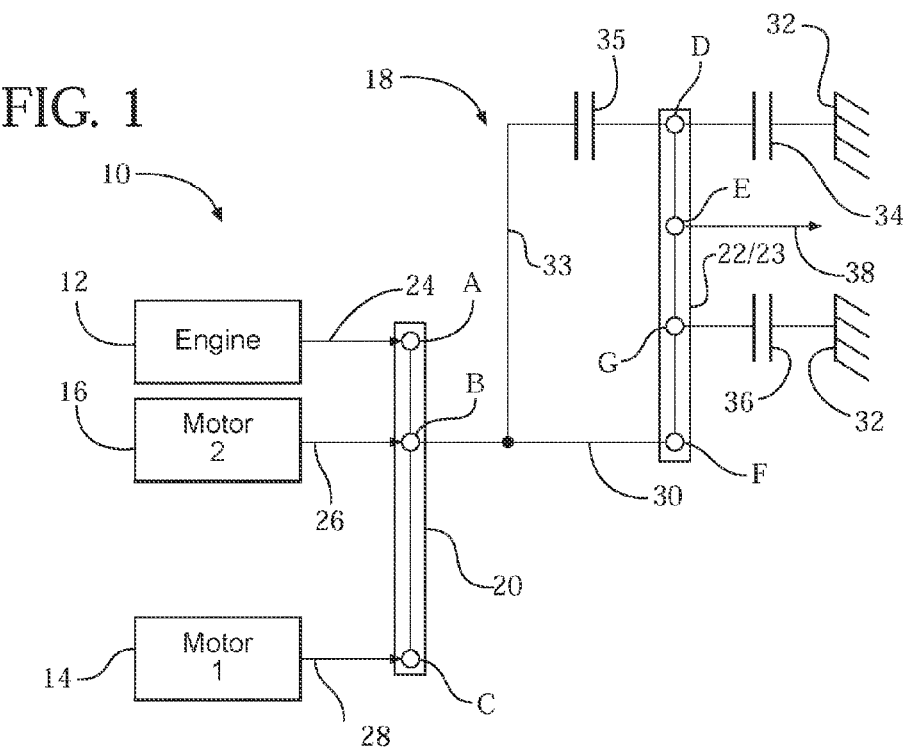
FIG. 1 is a schematic lever diagram illustration of an electrically variable transmission employed in a hybrid powertrain.

Referring to the drawings, wherein like reference numbers refer to like components, FIG. 1 illustrates a hybrid powertrain 10. The hybrid powertrain 10 includes multiple power sources, which include an internal combustion engine 12, a first electric motor/generator 14, and a second electric motor/generator 16, all connected to an "electrically variable transmission" (EVT) designated generally by the numeral 18. As is known by those skilled in the art, an "electrically variable transmission" constitutes a transmission planetary gear train operatively connected with each of the engine 12, the first motor/generator 14 and the second motor/generator 16. Channeling respective torques of the engine and the two motor/generators to different members of the planetary gear train permits one of the power sources to either assist or balance the operation of any of the other two. Thus, the combination of one engine 12 and two motor/generators 14 and 16 operatively connected to the EVT 18 allows speeds and torques of the engine and motor/generators to be controlled and selected independently in order to power a subject vehicle more efficiently. Furthermore, the connections of the hybrid powertrain 10, to be described in greater detail below, may permit an overall decrease in torque requirement from the combination of the first and the second motor/generators while affording acceptable vehicle performance, as compared with other systems.

The EVT 18 includes a planetary gear set connected with a compound planetary gear arrangement represented in lever diagram form in FIG. 1. A lever diagram is a schematic representation of the components of a mechanical device such as an automatic transmission. Each individual lever represents a planetary gear set or an external gear set. In the planetary gear set levers, the three basic mechanical components of the planetary gear are each represented by a node. Therefore, a single planetary gear set lever contains three nodes: one for the sun gear member, one for the planet gear carrier member, and one for the ring gear member. The relative length between the nodes of each planetary gear set lever can be used to represent the ring-to-sun ratio of each respective gear set. These lever ratios, in turn, are used to vary the gear ratios of the transmission in order to achieve appropriate ratios and ratio progression. Mechanical couplings or interconnections between the nodes of the various planetary gear sets are illustrated by thin, horizontal lines and torque transmitting devices such as clutches and brakes are presented as interleaved fingers. If the device is a brake, one set of the fingers is grounded. Further explanation of the format, purpose and use of lever diagrams can be found in SAE Paper 810102, authored by Benford, Howard and Leising, Maurice, "The Lever Analogy: A New Tool in Transmission Analysis", 1981, which is hereby fully incorporated by reference.

A lever or first planetary gear set 20 of EVT 18 includes a first, second, and third nodes, A, B and C, respectively. The nodes A, B, and C represent a first, second and third members of the first planetary gear set 20, preferably a ring gear member, a carrier member and a sun gear member, although not necessarily in that order. The EVT 18 also includes a compound planetary gear arrangement including a second planetary gear set 22 and a third planetary gear set 23, each gear set 22 and 23 having a ring gear member, a carrier member and a sun gear member. The second planetary gear set 22 and the third planetary gear set 23 are connected such that the resultant structure produces a four-node lever, and includes fourth, fifth, sixth, and seventh nodes D, E, F and G, respectively. In general, as known by those skilled in the art, a four-node lever is established by providing two separate fixed connections, i.e. pairings, between a member of one planetary gear set and a member of another planetary gear set, including in some cases pinion-to-pinion, or "long-pinion" connections. These connections reduce the maximum number of separately rotating inertias (about a common central axis) from six to four, or in arrangements with long-pinions to five, and the total degrees of freedom from four to two. Thus constrained, the compound planetary gear arrangement provides, in order of rotational speed, first, second, third, and fourth nodes.

Typical of the contemplated compound planetary gear arrangement providing a four-node lever is a double-pinion integrated structure gear set. Such a double-pinion integrated structure gear set generally includes a common carrier member, a sun gear member, and two sets of intermeshing pinion gears, where a first set of pinion gears intermeshes with the sun gear member. The first set of pinion gears also intermeshes and co-rotates with a second set of pinion gears. Because the two sets of pinion gears intermesh, the second pinion gear set reverses the direction of rotation of the first pinion gear set. The gears of the first set of pinion gears may have a different individual diameter than the pinion gears of the second set, thereby creating a fixed ratio between the gears of the first and of the second pinion gear sets. Employing a compound double-pinion integrated structure gear set in place of two conventional gear sets permits a compact gear train arrangement that is capable of providing an additional transmission gear ratio, and an output rotation whose direction is the reverse of its input. However, as understood by those skilled in the art, various compound planetary gear arrangements may be constructed to provide a four-node lever that will accomplish such a result, and place them within the scope of the lever diagram of FIG. 1.

The planetary gear sets 22 and 23 of EVT 18 are connected continuously at node D and at node F. Nodes D and F preferably represent the sun gear member of gear set 22 in fixed connection with the sun gear member of gear set 23, and the carrier member of gear set 22 in fixed connection with the carrier member of gear set 23, although not necessarily in that order. The nodes E and G, preferably representing the ring gear of gear set 22 and the ring gear of gear set 23, although not necessarily in that order, are not connected. As such, the planetary gear set 22 and the planetary gear set 23 may be distinct simple gear sets, such as the gear set 20, having entirely separate structures, or form a compound double-pinion integrated structure gear set 22/23, as understood by those skilled in the art.

Engine 12, first electric motor/generator 14 and second electric motor/generator 16 are operatively connected to the EVT 18 via respective input members, to thereby supply torque for driving the vehicle. The input members include an output shaft of the engine 12 which serves as an input member 24, a rotor of the second motor/generator 16 that serves as an input member 26, and a rotor of the first motor/generator 14 that serves as an input member 28. The input member 24 is configured to provide engine torque to the EVT 18. The input member 26 and input member 28 are each configured to provide torque from the second motor/generator and from the first motor/generator, respectively, to the EVT 18.

As shown, the first node A, is continuously connected to the input member 24, the second node B is continuously connected to the input member 26 and the third node C is continuously connected to the input member 28. Although engine 12, second electric motor/generator 16, and first electric motor/generator 14, as shown, are connected to nodes A, B, and C, respectively, the connections to nodes A, B, and C do not necessarily have to be in order of rotational speed. The connection of engine 12 at the first planetary gear set, however, may only be at a node that is not continuously connected to the compound planetary gear set.

A first interconnecting member 30 continuously interconnects the second node B with the sixth node F. The fourth node D is selectively connectable with a stationary member or housing 32 of the EVT 18 via a first torque-transmitting device 34, to thereby ground the fourth node. The fourth node D is selectively connectable with the sixth node F by way of a second interconnecting member 33 via a second torque-transmitting device 35. The seventh node G is selectively connectable with the stationary member 32 via a third torque-transmitting device 36, to thereby ground the fourth node. The first, second and third torque-transmitting devices 34, 35 and 36 may be configured as selectively or automatically engageable, and be capable of transmitting torque in two directions, as understood by those skilled in the art. Well known examples of torque-transmitting devices capable of transmitting torque in two directions are friction plate-type clutches, brakes, and dog clutches. The fifth node E is continuously connected with the output member 38, which provides output torque for launching and propelling the vehicle.

As understood by those skilled in the art, the powertrain 10 additionally has an electric power source (not shown), such as one or more batteries. The power source is operatively connected to the motor/generators 14 and 16 such that the motor/generators may transfer power to or receive power from the engine 12. The powertrain 10 also includes a controller or ECU (not shown). The controller is operatively connected to the electric power source to control the distribution of power from or to the power source.

Figure 2:
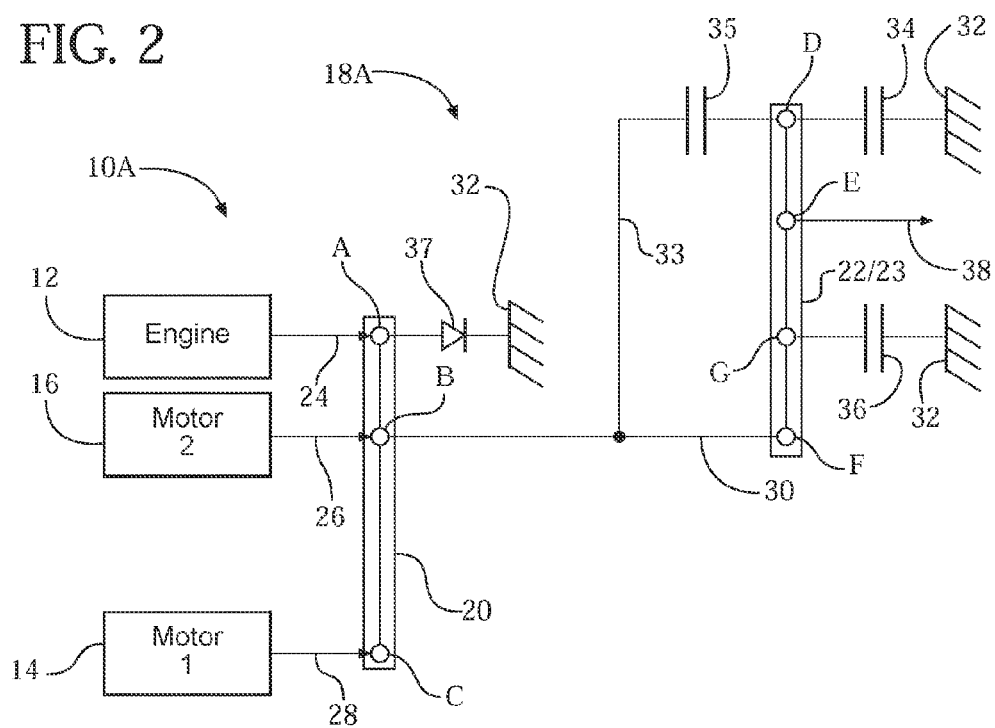
FIG. 2 is a schematic lever diagram illustration of an electrically variable transmission having an optional engine grounding torque-transmitting device.

FIG. 2 depicts a powertrain 10A which is identical to powertrain 10 shown in FIG. 1 in all respects other than having a fourth torque-transmitting device 37, with all identical elements numbered correspondingly. The fourth torque-transmitting device 37 is preferably a passive one-way-clutch, but may also be a selectively engageable brake to ground node A. Functionally, the fourth torque-transmitting device 37 serves as a brake to lock the first node A, to provide an electric-only propulsion in any gear state, both forward and reverse, by grounding engine 12 to stationary member 32.

Because EVT 18 has an explicit reverse gear, the fourth torque-transmitting device 37 may be a passive one-way clutch to effectively and reliably ground the engine 12, and prevent it from rotating backward. In turn, such ability to ground the engine permits a "strong" electric-only launch of the vehicle, i.e., employing both motor/generators 14 and 16, either forward or in reverse, with the capability to transmit torque that is roughly equivalent to a full-throttle engine launch. By contrast, without the benefit of an explicit reverse gear, the strongest possible electric-only reverse launch, i.e., using both motor/generators 14 and 16, typically requires engine 12 to resist being rotated forward, while the forward launch requires the engine to resist being rotated backward. Hence, without a dedicated reverse gear, as employed herein, an actively controlled, two-way clutch is commonly required for "strong" electric-only launch torque capability.

The first electrically variable forward mode of powertrain 10 shown in FIG. 1 is an under-drive connection between the second motor/generator 16 and the output member 38, established by engaging the first torque-transmitting device 34 and disengaging both the second and the third torque-transmitting devices 35 and 36. The under-drive forward mode provides an advantageous low gear ratio, i.e., greater than 1:1, between the input member 26 and the output member 38, thereby multiplying torque developed by the second motor/generator 16 to permit the second motor/generator, even without the aid of the engine 12, to adequately launch the vehicle.

The second electrically variable forward mode is a direct-drive connection between the second motor/generator 16 and the output member 38, established by disengaging the first and the third torque-transmitting devices 34 and 36, and engaging the second torque-transmitting device 35. The direct-drive forward mode provides a 1:1 gear ratio between the input member 26 and the output member 38, thereby permitting the torque developed by the second motor/generator 16 to sustain higher vehicle speeds.

The powertrain 10 of FIG. 1 also includes a third electrically variable mode that provides a reverse gear, i.e., a reverse mode. Although the provided electrically variable reverse mode may have any specific gear ratio, a preferred embodiment provides a mechanically advantageous low gear ratio under-drive mode, i.e., greater than 1:1, connection between the power source and the output member 38. The reverse mode is established by engaging the third torque-transmitting device 36, and disengaging the first and the second torque-transmitting devices 34 and 35.

Figure 3:
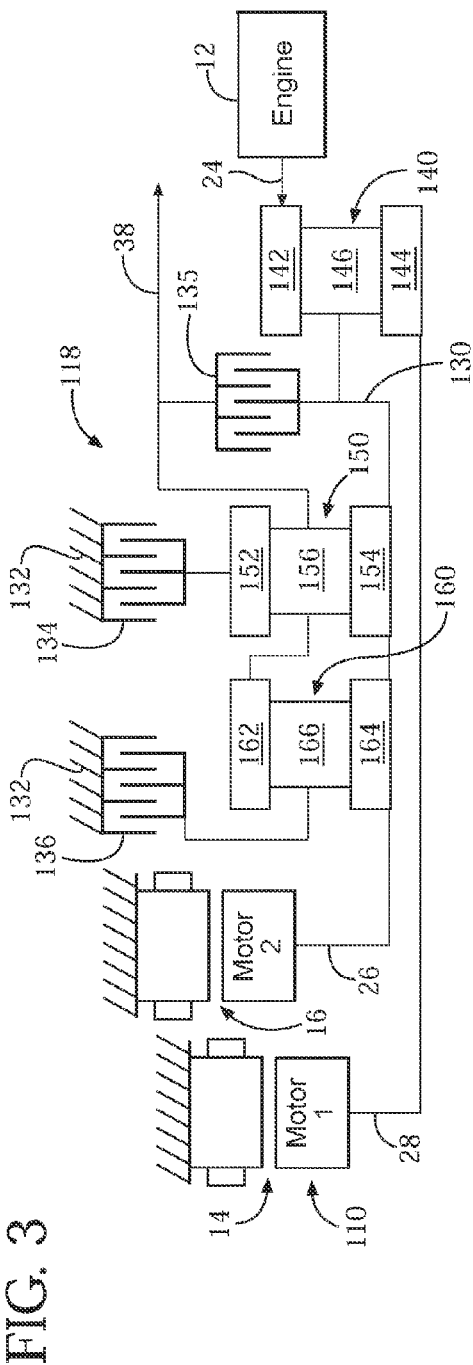
FIG. 3 is a schematic stick diagram illustration of the powertrain employing three planetary gear sets corresponding with the lever diagram of FIG. 1.

FIG. 3 depicts a powertrain 110 having an EVT 118. The powertrain 110 is a specific embodiment of the powertrain 10 shown in FIG. 1. The EVT 118 is represented by a schematic stick diagram that depicts specific planetary gear set connections corresponding to, and reflected by the lever diagram of FIG. 1. Although a specific powertrain 110 is represented, it will be understood that the particular embodiment is simply exemplary in nature, and other powertrain arrangements within the scope of the lever diagram of FIG. 1 are also contemplated.

The EVT 118 utilizes three differential gear sets, preferably in the nature of a first planetary gear set 140, a second planetary gear set 150 and a third planetary gear set 160. The first, second and third planetary gear sets 140, 150 and 160 are simple single-planetary gear sets which combines two planetary gear sets into one, such as described with respect to FIG. 1. First planetary gear set 140 employs a ring gear member 142, which circumscribes a sun gear member 144. A carrier member 146 rotatably supports a plurality of pinion gears that meshingly engage both the ring gear member 142 and the sun gear member 144. The first motor/generator 14 is continuously connected to the sun gear member 144. The engine 12 is continuously connected to the ring gear member 142.

The second planetary gear set 150 employs a ring gear member 152, which circumscribes a sun gear member 154. A carrier member 156 rotatably supports a plurality of pinion gears that meshingly engage both the ring gear member 152 and the sun gear member 154. The third planetary gear set 160 employs a ring gear member 162, which circumscribes a sun gear member 164. A carrier member 166 rotatably supports a plurality of pinion gears that meshingly engage both the ring gear member 162 and the sun gear member 164. The carrier member 156 is continuously connected to the ring gear member 162, and the sun gear member 154 is continuously connected to the sun gear member 164.

The sun gear member 154 is continuously connected, i.e., fixed, to the carrier member 146 via an interconnecting member 130. The carrier member 156 is continuously connected, i.e., fixed, to the ring gear member 162 via an interconnecting member 157. The sun gear member 164 is continuously connected, i.e., fixed, to the sun gear member 154 via an interconnecting member 158, while the carrier member 156 is continuously connected to the output member 38. The second motor/generator 16 is continuously connected with the sun gear member 164 via the input member 26, and is therefore also connected with the sun gear member 154. Given that the interconnecting member 130 continuously connects carrier member 146 with sun gear member 154, second motor/generator 16 is also continuously connected to carrier member 146.

The first torque-transmitting device 134 is selectively engageable to ground the ring gear member 152 with a stationary member 132, e.g., the transmission housing. The second torque-transmitting device 135 is selectively engageable to connect the carrier member 146 with the carrier member 156. The third torque-transmitting device 136 is selectively engageable to ground the carrier member 166 with the stationary member 132. The torque-transmitting devices 134, 135 and 136 are engageable in like manner as corresponding torque-transmitting devices 34, 35 and 36, of FIG. 1, to establish first, second and third electrically variable forward modes.

Thus, two members of the planetary gear set 150 are continuously connected with two members of the planetary gear set 160, such that second and third planetary gear sets 150 and 160 establish a four node lever. Accordingly, the connections and interactions between planetary gear sets 140, 150 and 160 are reflected by the lever diagram depicted in FIG. 1. Ring gear member 142, carrier member 146, and sun gear member 144 correspond to nodes A, B, and C of FIG. 1, respectively. Ring gear member 152, carrier member 156 in fixed connection with ring gear member 162, carrier member 166, and sun gear member 154 in fixed connection with sun gear member 164 correspond to nodes D, E, F, and G, respectively, of FIG. 1.

Figure 4:
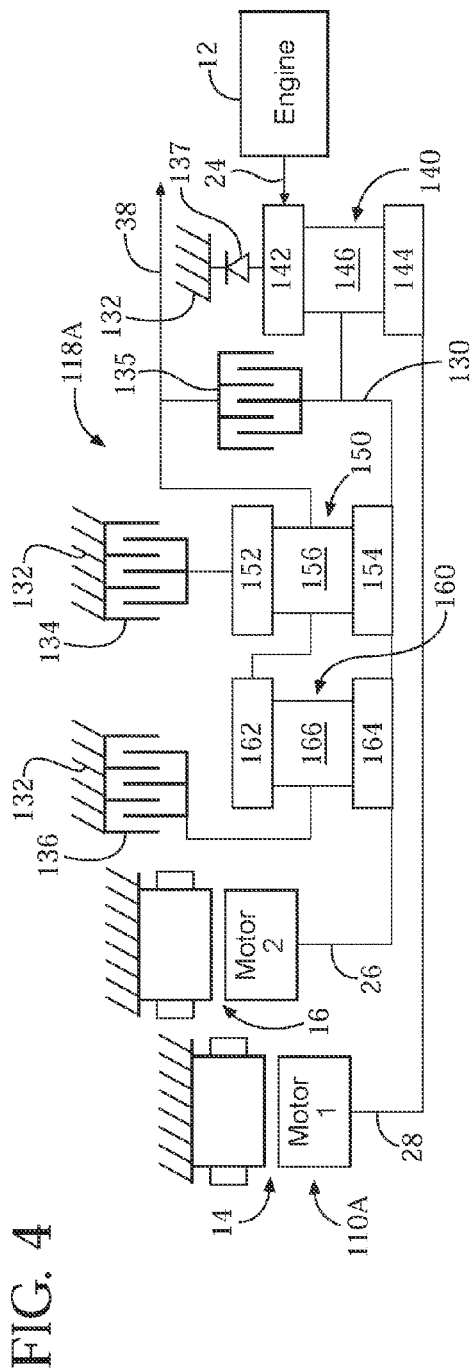
FIG. 4 is a schematic stick diagram illustration of the powertrain employing three planetary gear sets corresponding with the lever diagram of FIG. 2.

FIG. 4 depicts a powertrain 110A having an EVT 118A which is identical to powertrain 110 shown in FIG. 3 in all respects other than having a fourth torque-transmitting device 137, with all identical elements numbered correspondingly. The powertrain 118A is a specific embodiment of a powertrain 10A shown in FIG. 2. The EVT 118A is represented by a schematic stick diagram that depicts specific planetary gear set connections corresponding to, and reflected by the lever diagram of FIG. 2. Although a specific powertrain 110A is represented, it will be understood that the particular embodiment is simply exemplary in nature, and other powertrain arrangements within the scope of the lever diagram of FIG. 2 are also contemplated.

The fourth torque-transmitting device 137 is engageable as a brake in like manner as corresponding torque-transmitting device 37 of FIG. 2. Fourth torque-transmitting device 137 is arranged to couple engine 12 to stationary member 132, and may be physically positioned at either end of the engine's crankshaft, or at the ring gear member 142 (as shown in FIG. 4). By engaging the fourth torque-transmitting device 137, the transmission 118A is enabled to provide a "strong" electric-only vehicle propulsion, in both forward and reverse gears, solely via the motor/generators 14 and 16.

Figure 5:
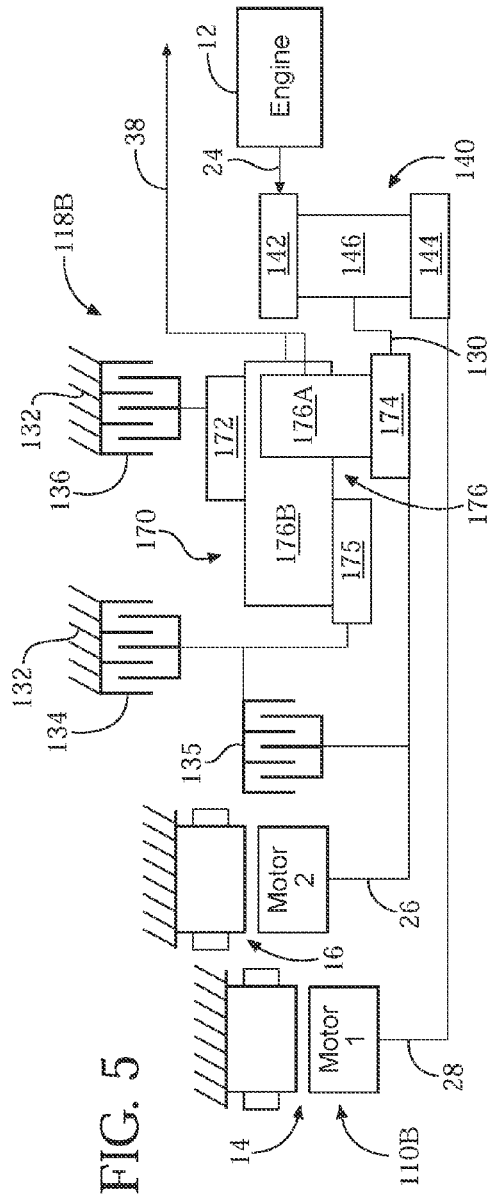
FIG. 5 is a schematic stick diagram illustration of the powertrain employing one simple planetary gear set and one compound planetary gear set corresponding with the lever diagram of FIG. 1.

FIG. 5 depicts a powertrain 110B having an EVT 118B. The powertrain 110B is a specific embodiment of the powertrain 10 shown in FIG. 1. The EVT 118B is represented by a schematic stick diagram that depicts specific planetary gear set connections corresponding to, and reflected by the lever diagram of FIG. 1. Although a specific powertrain 110B is represented, it will be understood that the particular embodiment is simply exemplary in nature, and other powertrain arrangements within the scope of the lever diagram of FIG. 1 are also contemplated.

The EVT 118B utilizes two differential gear sets, preferably in the nature of a first planetary gear set 140 and a second planetary gear set 170. The second planetary gear set 170 is a compound planetary gear arrangement, specifically a double-planetary gear set, such as described with respect to FIG. 1. First planetary gear set 140, identically to the first planetary gear set 140 described with respect to FIG. 1, employs a ring gear member 142, which circumscribes a sun gear member 144. A carrier member 146 rotatably supports a plurality of pinion gears that meshingly engage both the ring gear member 142 and the sun gear member 144. The first motor/generator 14 is continuously connected to the sun gear member 144. The engine 12 is continuously connected to the ring gear member 142.

The second planetary gear set 170 employs a ring gear member 172, which circumscribes both a first sun gear member 174 and a second sun gear member 175. In order to provide different rotational speed outputs from the compound gear arrangement, first and second sun gear members 174 and 175 have different outer diameters. The planetary gear set 170 also employs a single carrier member 176 that rotatably supports two sets of pinion gears, the first set of pinion gears 176A and the second set of pinion gears 176B. The first set of pinion gears 176A meshingly engages both the sun gear member 174 and the second set of pinions 176B. In addition to engaging the first set of pinion gears 176A, the second set of pinion gears 176B meshingly engages the ring gear member 172 and the sun gear member 175. The output member 38 is continuously connected with the carrier member 176.

An interconnecting member 130 continuously connects carrier member 146 with sun gear member 174. Second motor/generator 16 is continuously connected with sun gear member 174, and is thereby also continuously connected to carrier member 146. The interconnecting member 130 may be one component or separate components. Thus, the compound gear set 170 includes two separate fixed connections, a common carrier member 176 and a common ring gear 172, and therefore establishes a four node lever. Accordingly, the connections and interactions between planetary gear sets 140 and 170 are reflected by the lever diagram depicted in FIG. 1. Ring gear member 142, carrier member 146, and sun gear member 144 correspond to nodes A, B, and C of FIG. 1, respectively. Sun gear member 175, carrier member 176, sun gear member 174, and ring gear member 172 correspond to nodes D, E, F, and G, respectively, of FIG. 1.

The first torque-transmitting device 134 is selectively engageable to ground the ring gear member 172 with a stationary member 132, e.g., the transmission housing. The second torque-transmitting device 135 is selectively engageable to connect the sun gear member 174 with the sun gear member 175, and also to connect the input member 26 with the sun gear member 175. The third torque-transmitting device 136 is selectively engageable to ground the ring gear member 172 with a stationary member 132. The torque-transmitting devices 134, 135 and 136 are engageable in like manner as corresponding torque-transmitting devices 34, 35 and 36, respectively of FIG. 1, to establish first, second and third electrically variable forward modes.

Figure 6:
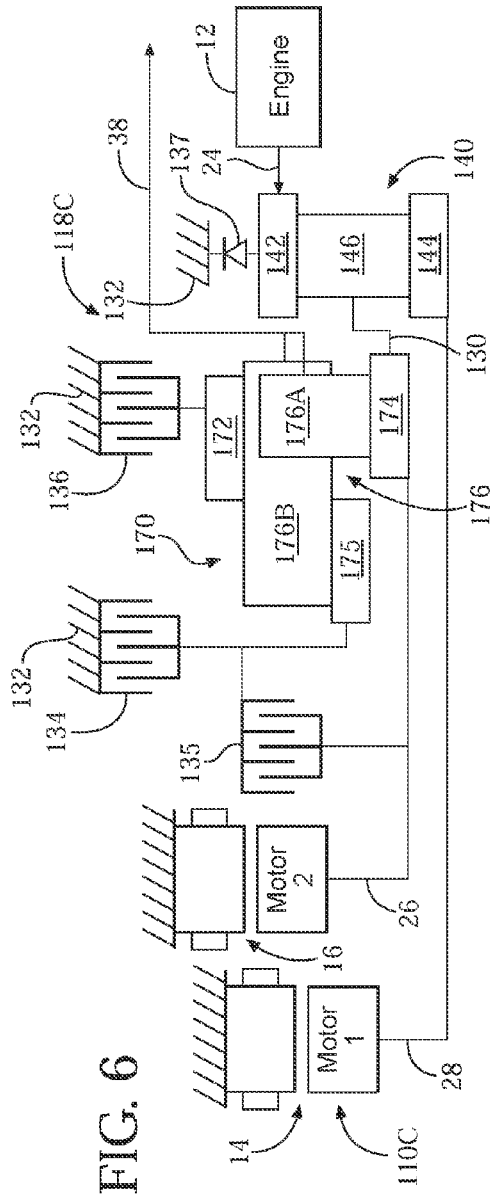
FIG. 6 is a schematic stick diagram illustration of the powertrain employing one simple planetary gear set and one compound planetary gear set corresponding with the lever diagram of FIG. 2.

FIG. 6 depicts a powertrain 110C having an EVT 118C which is identical to powertrain 110B shown in FIG. 5 in all respects other than having a fourth torque-transmitting device 137, with all identical elements numbered correspondingly. The powertrain 110C is a specific embodiment of a powertrain 10A shown in FIG. 2. The EVT 118C is represented by a schematic stick diagram that depicts specific planetary gear set connections corresponding to, and reflected by the lever diagram of FIG. 2. Although a specific powertrain 110C is represented, it will be understood that the particular embodiment is simply exemplary in nature, and other powertrain arrangements within the scope of the lever diagram of FIG. 2 are also contemplated. The fourth torque-transmitting device 137 is engageable as a brake in like manner as corresponding torque-transmitting device 37 of FIG. 2, and may be arranged as described with respect to FIG. 4. By engaging the fourth torque-transmitting device 137, the EVT 118C is enabled to provide a "strong" electric-only reverse vehicle launch solely via the motor/generators 14 and 16.

As will be readily understood by those skilled in the art, EVT 118-118C is appropriate for a front-wheel-drive vehicle architecture, as the output member 38 is in a location well suited for a transverse arrangement common to front-wheel-drive vehicle applications. However, because EVT 118-118C provides a reverse mode for launching the vehicle via the first and the second motor/generators 14 and 16, it is also readily adaptable to rear-wheel drive applications that may be required to tow heavier loads.

A vehicle employing powertrain 10 or 10A, shown in FIGS. 1 and 2 respectively, may be launched from rest in the forward under-drive mode and then switched to being propelled in the forward direct-drive mode to sustain higher vehicle speeds. The second motor/generator 16 is sized sufficiently to provide ample input torque to both launch the vehicle in the forward under-drive mode, and propel the vehicle in the forward direct-drive mode of the EVT 18, 18A over a wide range of speeds without assist from either the first motor/generator 14 or the engine 12. In the event the vehicle is required to generate a speed or pull a load that exceeds power capacity of the second motor/generator 16, torque from the first motor/generator 14 and/or the engine 12 may be added to assist the second motor/generator. Additionally, a vehicle employing powertrain 10A may be driven strongly and effectively in both forward and reverse gears, via at least one of the first and the second motor/generators 14 and 16 without the aid of the engine 12. Such strong electric-only propulsion is enabled by having fourth torque transmitting device 37 prevent engine 12 from being rotated by motor/generators 14 and 16, thereby permitting a higher percentage of motor/generator torque to drive the vehicle.

Figure 7:
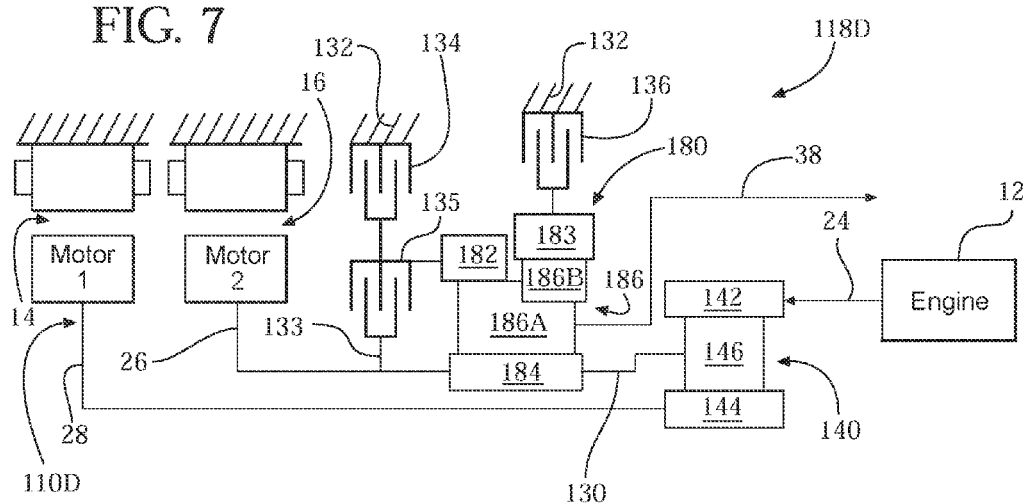
FIG. 7 is a schematic stick diagram illustration of the powertrain employing one simple planetary gear set and one compound planetary gear set corresponding with the lever diagram of FIG. 1.

FIG. 7 depicts a powertrain 110D having an EVT 118D. The powertrain 110D is another specific embodiment of the powertrain 10 shown in FIG. 1. The EVT 118D is represented by a schematic stick diagram that depicts specific planetary gear set connections corresponding to, and reflected by the lever diagram of FIG. 1. The EVT 118D utilizes two differential gear sets, preferably in the nature of a first planetary gear set 140 and a second planetary gear set 180. The second planetary gear set 180 is a compound planetary gear arrangement, specifically a double-planetary gear set, such as described with respect to FIG. 1. First planetary gear set 140, identically to the first planetary gear set 140 described with respect to FIG. 1, employs a ring gear member 142, which circumscribes a sun gear member 144. A carrier member 146 rotatably supports a plurality of pinion gears that meshingly engage both the ring gear member 142 and the sun gear member 144. The first motor/generator 14 is continuously connected to the sun gear member 144. The engine 12 is continuously connected to the ring gear member 142.

The second planetary gear set 180 employs a first ring gear member 182 and a second ring gear member 183, which together, but at different diameters, circumscribe a sun gear member 184. In order to provide different rotational speed outputs from the compound gear arrangement, first and second ring gear members 182 and 183 have different outer diameters. The planetary gear set 180 also employs a single carrier member 186 that rotatably supports two sets of pinion gears, the first set of pinion gears 186A and the second set of pinion gears 186B. The first set of pinion gears 186A meshingly engages the ring gear member 182, the sun gear member 184, and the second set of pinion gears 186B. In addition to engaging the first set of pinion gears 186A, the second set of pinion gears 186B meshingly engages the ring gear. The output member 38 is continuously connected with the carrier member 186.

An interconnecting member 130 continuously connects carrier member 146 with sun gear member 184. Second motor/generator 16 is continuously connected with sun gear member 184, and is thereby also continuously connected to carrier member 146. The interconnecting member 130 may be one component or separate components. Thus, the compound gear set 180 includes two separate fixed connections, a common carrier member 186 and a common sun gear 184, and therefore establishes a four node lever. Accordingly, the connections and interactions between planetary gear sets 140, and 180 are reflected by the lever diagram depicted in FIG. 1. The ring gear member 142 corresponds with the first node A of FIG. 1. The carrier member 146 corresponds with the second node B of FIG. 1. The sun gear member 144 corresponds with the third node C of FIG. 1. The ring gear member 182 corresponds with the fourth node D of FIG. 1. The carrier member 186 corresponds with the fifth node E of FIG. 1. The sun gear member 184 corresponds with the sixth node F of FIG. 1, and is continuously connected with the carrier member 146, a.k.a. second node B. The ring gear member 183 corresponds with the seventh node G of FIG. 1.

The first torque-transmitting device 134 is selectively engageable to ground the ring gear member 182 with a stationary member 132, e.g., the transmission housing. The second torque-transmitting device 135 is selectively engageable to connect the ring gear member 182 with the sun gear member 184, and also to connect the input member 26 with the ring gear member 182. The third torque-transmitting device 136 is selectively engageable to ground the ring gear member 183 with a stationary member 132. The torque-transmitting devices 134, 135 and 136 are engageable in like manner as corresponding torque-transmitting devices 34, 35 and 36, respectively of FIG. 1, to establish first, second and third electrically variable forward modes.

Figure 8:
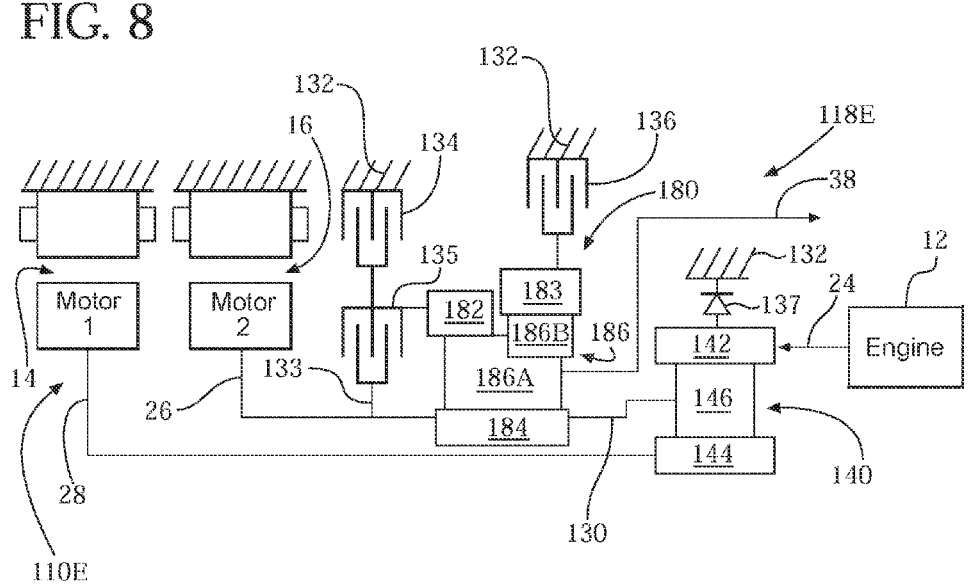
FIG. 8 is a schematic stick diagram illustration of the powertrain employing one simple planetary gear set and one compound planetary gear set corresponding with the lever diagram of FIG. 2.

FIG. 8 depicts a powertrain 110E having an EVT 118E which is identical to powertrain 110D shown in FIG. 7 in all respects other than having a fourth torque-transmitting device 137, with all identical elements numbered correspondingly. The powertrain 110E is a specific embodiment of a powertrain 10A shown in FIG. 2. The EVT 118E is represented by a schematic stick diagram that depicts specific planetary gear set connections corresponding to, and reflected by the lever diagram of FIG. 2. The fourth torque-transmitting device 137 is engageable as a brake in like manner as corresponding torque-transmitting device 37 of FIG. 2, and may be arranged as described with respect to FIG. 4.

While the best modes for carrying out the invention have been described in detail, those familiar with the art to which this invention relates will recognize various alternative designs and embodiments for practicing the invention within the scope of the appended claims.

The invention claimed is:

1. A hybrid electro-mechanical transmission connectable with multiple power sources for launching and propelling a vehicle, comprising:
 an output member;
 a stationary member;
 a first planetary gear set having a first, a second, and a third node; and
 a compound planetary gear arrangement having a fourth, a fifth, a sixth and a seventh node;
the power sources including:
 a first motor/generator;
 a second motor/generator; and
 an engine;
wherein:
 the engine, the first motor/generator and the second motor/generator are each operatively connected with the first planetary gear set, the output member and the second motor/generator are each operatively connected with the compound planetary gear arrangement, such that the transmission provides a forward under-drive mode for launching the vehicle, a forward direct-drive mode for propelling the vehicle at higher speeds, and a reverse mode for launching the vehicle.

2. The transmission of claim 1, wherein:
 the compound planetary gear arrangement includes a second and a third planetary gear set;
 the first node is a ring gear member of the first planetary gear set, the second node is a carrier member of the first planetary gear set, and the third node is a sun gear member of the first planetary gear set; and
 the fourth node is a ring gear member of the second planetary gear set, the fifth node is a carrier member of the second planetary gear set in fixed connection with a carrier member of the third planetary gear set, the sixth node is a sun gear member of the second planetary gear set in fixed connection with a sun gear member of the third planetary gear set, and the seventh node is a ring gear member of the third planetary gear set.

3. The transmission of claim 1, wherein:
 the engine is operatively connected to the first node;
 the first motor/generator is operatively connected to the third node;
 the second motor/generator is operatively connected to the second and to the sixth nodes; and
 the output member is operatively connected to the seventh node.

4. The transmission of claim 3, further comprising:
 a first torque-transmitting device, a second torque-transmitting device and a third torque-transmitting device;
wherein:
 the first torque-transmitting device is engageable to ground the fourth node to the stationary member;
 the second torque-transmitting device is engageable to lock any one of the fourth, the fifth, the sixth and the seventh node to any other of the fourth, the fifth, the sixth and the seventh node;
 the third torque-transmitting device is engageable to ground the seventh node to the stationary member.

5. The transmission of claim 4, wherein engaging the first torque-transmitting device and disengaging both the second and the third torque-transmitting devices provides the forward under-drive mode.

6. The transmission of claim 4, wherein engaging the second torque-transmitting device and disengaging both the first and the third torque-transmitting devices provides the forward direct-drive mode.

7. The transmission of claim 4, wherein engaging the third torque-transmitting device and disengaging both the first and the second torque-transmitting device provides the reverse mode.

8. The transmission of claim 4, wherein any of the first torque-transmitting device, the second torque-transmitting device and the third torque-transmitting device is one of a selectively engageable clutch and a selectively engageable brake capable of transmitting torque in two directions.

9. The transmission of claim 4, further comprising a fourth torque-transmitting device, wherein the fourth torque-transmitting device is engageable to ground the engine to the stationary member, such that the transmission provides the forward under-drive mode and the reverse mode for launching the vehicle via at least one of the first and the second motor/generators without the aid of the engine.

10. The transmission of claim 9, wherein the fourth torque-transmitting device is a one way clutch.

11. The transmission of claim 1, wherein the respective operative connections of the engine and of the first and second motor/generators with the first planetary gear set and the compound planetary gear arrangement facilitate a controlled selection of speeds and torques of the engine and of the motor/generators for launching and propelling the vehicle.

12. A hybrid powertrain for launching and propelling a vehicle, comprising:
 an engine;
 a first motor/generator;
 a second motor/generator,
 an electrically-variable transmission having:
  an output member;
  a stationary member;
  a first planetary gear set having a first, a second, and a third node, and a compound planetary gear arrangement having a fourth, a fifth, a sixth and a seventh node; and
  a first torque-transmitting device, a second torque-transmitting device and a third torque-transmitting device, wherein the first torque-transmitting device is engageable to ground the fourth node to the stationary member, the second torque-transmitting device is engageable to lock any one of the fourth, the fifth, the sixth and the seventh node to any other of the fourth, the fifth, the sixth and the seventh node, and the third torque-transmitting device is engageable to ground the seventh node to the stationary member;
wherein:
 the engine is operatively connected to the first node, the first motor/generator is operatively connected to the third node, the second motor/generator is operatively connected to the second and to the sixth node, and the output member is operatively connected to the seventh node, such that the powertrain includes a forward under-drive mode for launching the vehicle, a forward direct-drive mode for propelling the vehicle at higher speeds, and a reverse mode for launching the vehicle.

13. The hybrid powertrain of claim 12, wherein:

the compound planetary gear arrangement includes a second and a third planetary gear set;

the first node is a ring gear member of the first planetary gear set, the second node is a carrier member of the first planetary gear set, and the third node is a sun gear member of the first planetary gear set; and the fourth node is a ring gear member of the second planetary gear set, the fifth node is a carrier member of the second planetary gear set in fixed connection with a carrier member of the third planetary gear set, the sixth node is a sun gear member of the second planetary gear set in fixed connection with a sun gear member of the third planetary gear set, and the seventh node is a ring gear member of the third planetary gear set.

14. The hybrid powertrain of claim 12, wherein engaging the first torque-transmitting device and disengaging both the second and the third torque-transmitting devices provides the forward under-drive mode.

15. The hybrid powertrain of claim 12, wherein engaging the second torque-transmitting device and disengaging both the first and the third torque-transmitting devices provides the forward direct-drive mode.

16. The hybrid powertrain of claim 12, wherein engaging the third torque-transmitting device and disengaging both the first and the second torque-transmitting device provides the reverse mode.

17. The hybrid powertrain of claim 12, wherein any of the first torque-transmitting device, the second torque-transmitting device and the third torque-transmitting device is one of a selectively engageable clutch and a selectively engageable brake capable of transmitting torque in two directions.

18. The hybrid powertrain of claim 12, further comprising a fourth torque-transmitting device, wherein the third torque-transmitting device is engageable to ground the engine to the stationary member, such that the transmission provides the forward under-drive mode and the reverse mode for launching the vehicle without the aid of the engine.

19. The hybrid powertrain of claim 18, wherein the fourth torque-transmitting device is a one way clutch.

20. The hybrid powertrain of claim 12, wherein the respective operative connections of the engine and of the first and second motor/generators with the first planetary gear set and the compound planetary gear arrangement facilitate a controlled selection of speeds and torques of the engine and of the motor/generators for launching and propelling the vehicle.

\* \* \* \* \*